US007500400B1

(12) United States Patent
Huber

(10) Patent No.: US 7,500,400 B1
(45) Date of Patent: Mar. 10, 2009

(54) DISPLACEABLE PIECE OF FURNITURE

(75) Inventor: Edgar Huber, Hard (AT)

(73) Assignee: Julius Blum GmbH, Hochst (AT)

( * ) Notice: Subject to any disclaimer, the term of this patent is extended or adjusted under 35 U.S.C. 154(b) by 47 days.

(21) Appl. No.: 11/448,740

(22) Filed: Jun. 8, 2006

Related U.S. Application Data

(63) Continuation of application No. PCT/AT2004/00376, filed on Oct. 29, 2004.

(30) Foreign Application Priority Data

Dec. 17, 2003 (AT) ............................ A 2036/2003

(51) Int. Cl.
*G01N 3/00* (2006.01)

(52) U.S. Cl. .......................................... 73/795; 73/760

(58) Field of Classification Search ............ 73/760–856
See application file for complete search history.

(56) References Cited

U.S. PATENT DOCUMENTS 4,121,453 A * 10/1978 Levin et al. ................... 73/172
4,458,770 A * 7/1984 Bucci ..................... 177/210 C
4,565,094 A * 1/1986 Sedgewick ................. 73/866.5
4,733,736 A * 3/1988 Holtgreven et al. ......... 177/255
4,802,371 A * 2/1989 Calderara et al. ...... 73/862.043
4,821,584 A * 4/1989 Lembke ................... 73/862.68
4,912,727 A * 3/1990 Schubert .................. 312/334.8
5,028,130 A * 7/1991 Hoffmann et al. ............. 356/35
5,530,435 A * 6/1996 Toms et al. ............ 340/825.52
6,119,530 A * 9/2000 Oddsson et al. .......... 73/862.42
6,870,341 B2 * 3/2005 Nagaoka et al. ............. 318/475
2003/0001396 A1 1/2003 Joss et al.
2003/0122459 A1 7/2003 Huber et al.
2003/0122519 A1 * 7/2003 Huber et al. ................ 318/646

FOREIGN PATENT DOCUMENTS

| | | |
|---|---|---|
| DE | 198 11 394 | 9/1999 |
| DE | 101 31 436 | 1/2003 |
| EP | 1 323 363 | 7/2003 |
| EP | 1 323 364 | 7/2003 |
| WO | 99/48043 | 9/1999 |

* cited by examiner

*Primary Examiner*—Max Noori
(74) *Attorney, Agent, or Firm*—Wenderoth, Lind & Ponack, L.L.P.

(57) ABSTRACT

A movable furniture part has at least one force sensor to measure the forces acting on the outer panel of the movable furniture part. The movable furniture part has an inner panel, behind an outer panel when viewed from the front and spaced at a distance therefrom. The at least one force sensor is disposed between outer panel and inner panel.

17 Claims, 7 Drawing Sheets

DISPLACEABLE PIECE OF FURNITURE

This application is a Continuation application of International Application Serial No. PCT/AT2004/00376, filed Oct. 29, 2004.

BACKGROUND OF THE INVENTION

The present invention concerns a movable furniture part with at least one force sensor to measure the forces acting on the outer panel of the movable furniture part.

A movable furniture part of this type is disclosed, for example, by EP 1 323 363 A1. The force signal measured by the force sensor can, for example, be interpreted as a desire for activation by the user. In the state of the art, the force sensor can be disposed between an outer panel of the movable furniture part and a part of the movable furniture part directly abutting thereon. The disadvantage of this is that if, for example, items placed in the furniture fall over, in or behind the movable furniture part, there can be a false triggering of the force sensor.

The object of the invention is to create a generic movable furniture part in which this problem does not arise.

SUMMARY OF THE INVENTION

This is achieved according to the invention by the fact that the movable furniture part has an inner panel, behind the outer panel when viewed from the front, and at a distance therefrom, and that the at least one force sensor is disposed between outer panel and inner panel.

According to the invention, a movable furniture part is thus created in which the force sensor or sensors has or have a higher degree of safety in use. Any displacement of items placed in the furniture and disposed in or behind the movable furniture part thus no longer leads to incorrectly detected forces and thus to a false triggering. According to the invention, forces exerted by a user by grasping the outer panel of the movable furniture part are also detected. In order to facilitate this type of use, the inner panel can have a smaller area than the outer panel, so that the outer panel projects at least in some areas beyond the inner panel. A special advantage of the inventive arrangement of the at least one force sensor is also the jamming protection thereby achieved. If an object should become jammed between the projecting outer panel of the furniture part lodged in an item of furniture and the furniture itself, the forces thereby arising are immediately registered by the force sensor and appropriate countermeasures can be initiated.

For example, provision may be made that from the outset, only the components of the forces in or opposing, respectively, the direction of movement of the movable furniture part are detected. Alternatively, provision may also be made that in the first instance all components of the forces acting on the movable furniture part are detected and the necessary components are selected electronically.

In one advantageous embodiment of the invention, provision may be made that the movable furniture part has at least two, and preferably at least three, force sensors disposed between the outer panel and the inner panel. The arrangement of several force sensors leads to a reduction of the force acting on an individual force sensor and thereby reduces the risk of damage to the individual force sensors by the forces acting on the outer panel of the movable furniture part.

Furthermore, provision can also be made, for example, that at least one force sensor is disposed on the inner panel. If all the force sensors provided are disposed on the inner panel, this brings with it the advantage that the outer panel, usually designed to match the rest of the item of furniture, can be produced separately from the movable furniture part.

The movable furniture part can, for example, be a drawer, a chest which can be raised, or a door. It could, for example, also be a shutter or similar.

The invention further concerns an item of furniture with a movable furniture part as described herein.

Preferably, provision is thereby made that the item of furniture has a drive unit to drive the movable furniture part. This can then at least support the movement of the movable furniture part by a user.

It can also be advantageous if the item of furniture has a control device to control the drive unit. This allows the power output of the drive unit to be adapted to the force exerted by a user on the movable furniture part.

The signals from the force sensor or sensors can be fed to an evaluation unit disposed in the item of furniture or in the movable furniture part. In an evaluation unit of this type, arithmetical operations can be performed in order to determine more precisely the necessary power output of the drive unit as a function of the magnitude of the force applied by the user to the movable furniture part.

The signals from the at least one force sensor can also be fed via electrical cables to the evaluation unit. This represents a simple alternative to other more expensive means of signal transmission. It would, however, also be possible to use contactless signal transmission, for example by radio.

In one especially advantageous embodiment of the invention, force sensors can include wire strain gauges. These are easy to use and offer a good solution. For preference, the wire strain gauges are electrically connected to a full bridge (Wheatstone bridge). The ratio of the measured bridge imbalance to the specified supply voltage corresponds to the sum of the relative change in length of the wire strain gauges.

The invention further concerns an item of furniture with a movable furniture part, an evaluation unit, and at least two piezo-electric force sensors to measure the forces acting on the outer panel of the movable furniture part, whereby the signals from the force sensors can be fed via electrical cables to the evaluation unit.

An item of furniture of this type is disclosed, for example, by EP 1 323 363 A1. Formerly, the force signals from the individual force sensors were transmitted individually to the evaluation unit where they were added up to determine the total force exerted on the movable furniture part.

The electrical cables leading from the force sensors to the evaluation unit may also be connected in parallel with each other and in series with the evaluation unit.

This brings with it the advantage that the electrical charges generated by the piezo-electric force sensors when a force is detected are already fed to the evaluation unit in the form of a sum. Therefore, the step formerly provided to determine the total force from the partial forces detected by the individual force sensors can be omitted.

The invention further concerns an item of furniture with a movable furniture part, an evaluation unit, and at least one force sensor to measure the forces acting on the outer panel of the movable furniture part. The signals from the force sensors can be fed to the evaluation unit.

Formerly, the evaluation unit was disposed so as to be stationary in the item of furniture itself. The disadvantage of this is that the analogue signals generated by the force sensors on the movable furniture part are relatively susceptible to interference and the signal quality starts to deteriorate as soon as the signals are transmitted from the force sensors to the evaluation unit in its stationary position in the item of furniture. Hence, the evaluation unit is disposed so as to travel along, in, or on the movable furniture part.

The result of this is that the signals which are generated by the force sensors and are susceptible to interference are transmitted over the smallest possible distance, which leads to a substantial improvement in signal quality.

BRIEF DESCRIPTION OF THE DRAWINGS

Further details and advantages of the invention are shown with the aid of the following figures and the description thereof, in which.

DETAILED DESCRIPTION OF THE INVENTION

Figure 1:
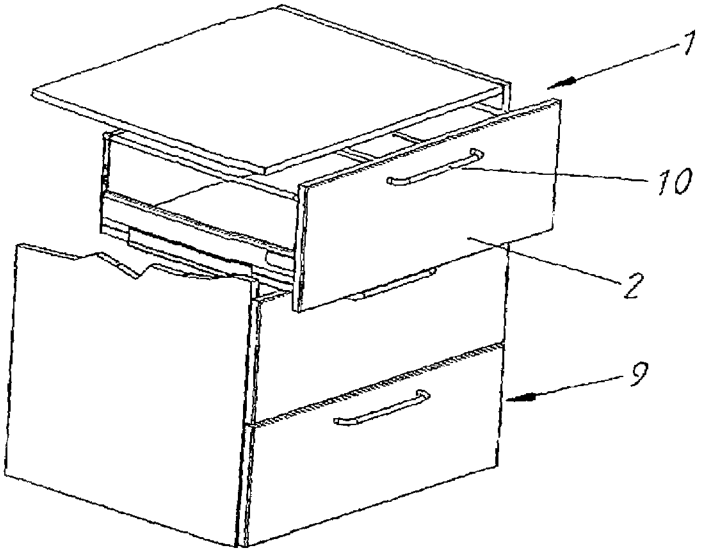
FIG. 1 is a perspective view of an embodiment of an inventive item of furniture.

FIG. 1 shows an item of furniture with an inventive movable furniture part 1, which in this embodiment is in the form of a drawer. The movable furniture part 1 has an outer panel 2 with a front surface on which a handle 10 is disposed.

Figure 2:
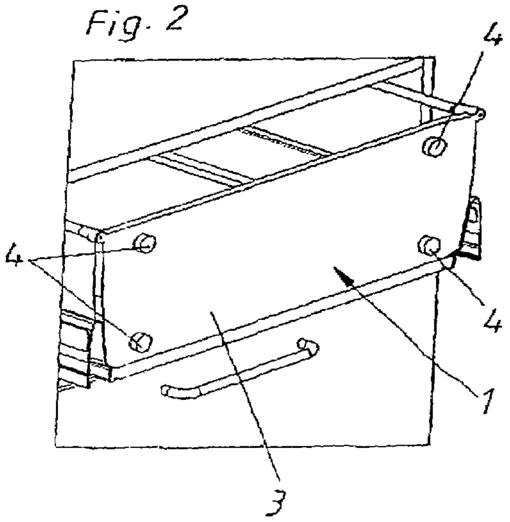
FIG. 2 is a detail view of the item of furniture shown in FIG. 1.

FIG. 2 shows the item of furniture 9 shown in FIG. 1 in detail in the area of the movable furniture part 1 with the outer panel 2 removed. The inner panel 3 can be seen, on which four force sensors 4 (here: piezo-electric force sensors) are disposed.

Figure 3:
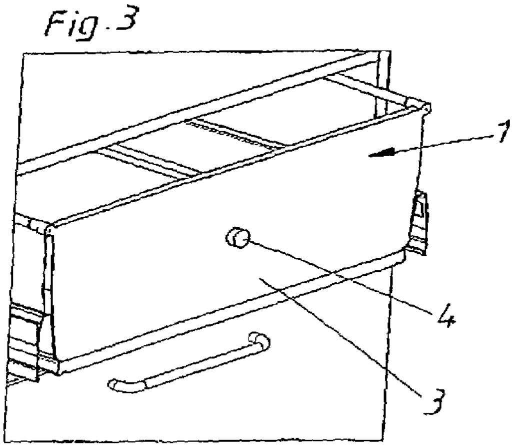
FIG. 3 is a detail view of a further embodiment of an inventive item of furniture.

FIG. 3 shows a further embodiment of an inventive movable furniture part 1, in which only one, centrally disposed, force sensor 4 is provided.

Figure 4A:
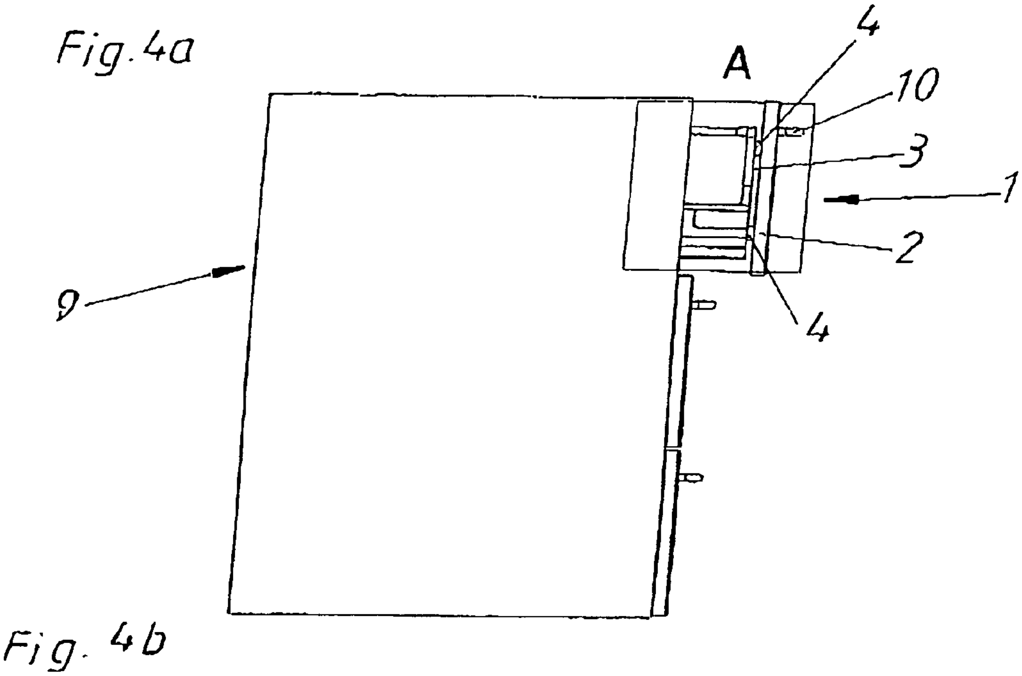
FIG. 4*a* is a lateral view of the item of furniture shown in FIG. 1.

FIG. 4*a* shows a lateral view of the item of furniture 9 shown in FIG. 1 with partially moved-out furniture part 1. The inner panel 3, the outer panel 2, and the force sensors 4 disposed between the outer panel and the inner panel can now be seen. In particular, the inner panel 3 is arranged behind the outer panel 2 so as to be spaced apart from and facing a rear surface of outer panel 2, and so the force sensors 4 are located between a front surface of the inner panel 3 and the rear surface of outer panel 2.

Figure 4B:
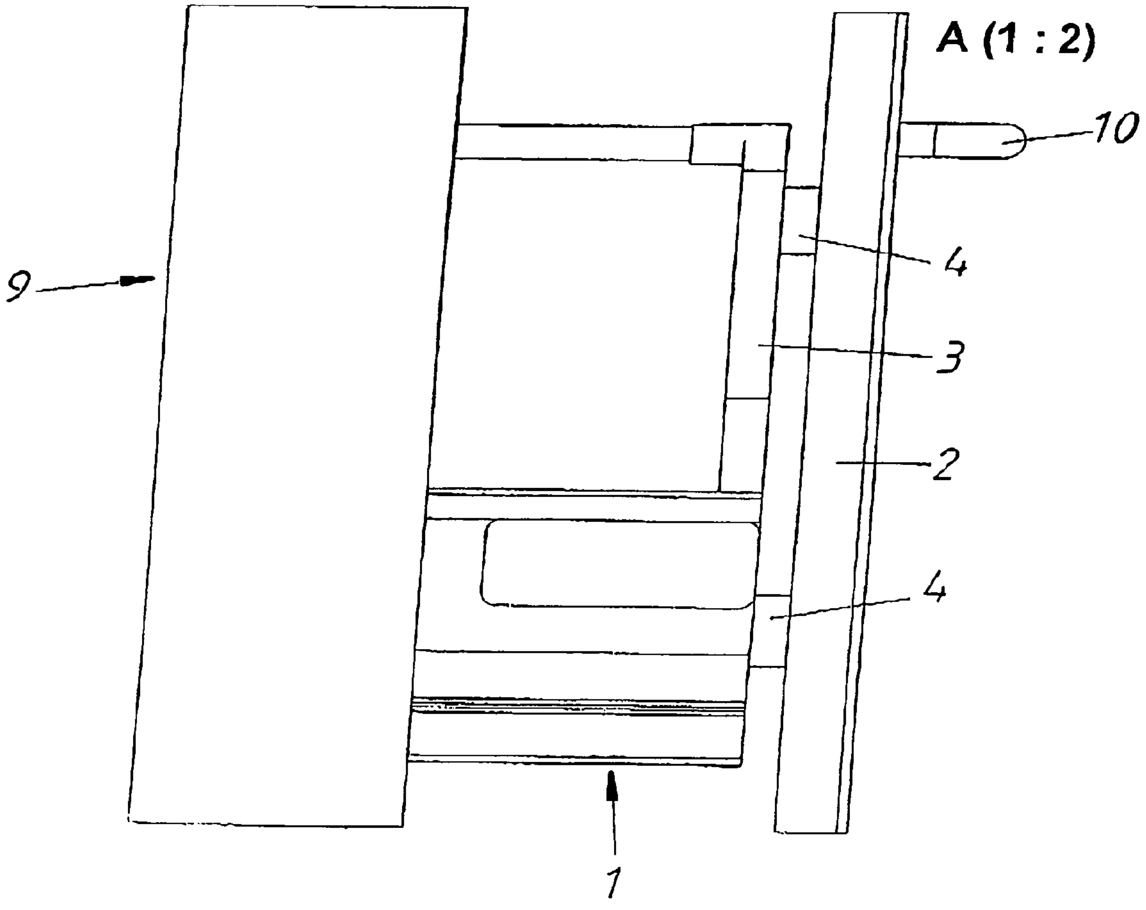
FIG. 4*b* is a detail view of the item of furniture shown in FIG. 4*a;*

FIG. 4*b* shows the area designated in FIG. 4*a* in detail.

Figure 5:
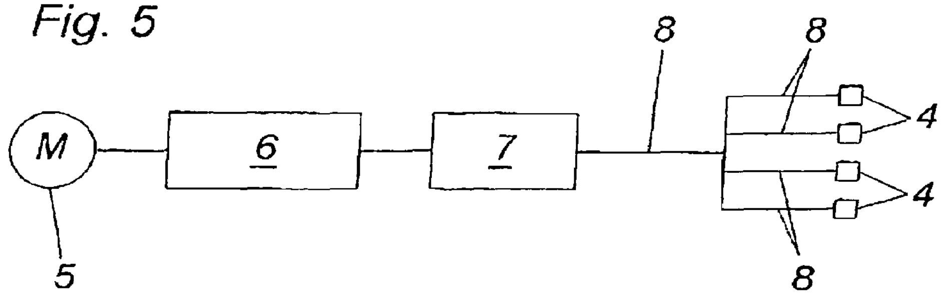
FIG. 5 is a representative illustration of an electrical circuit configuration of an inventive item of furniture.

FIG. 5 shows by way of example the circuit configuration of an inventive item of furniture 9 in which four piezo-electric force sensors 4 are connected via cables 8 to each other and in series with an evaluation unit 7. The evaluation unit 7 is connected via further cables with the control unit 6 which controls the drive unit 5, which in this embodiment is an electromotor.

Figure 6:
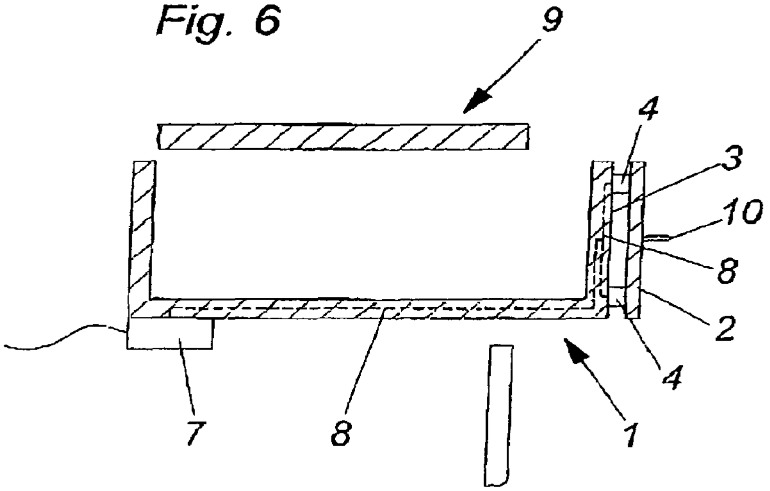
FIG. 6 is a sectional view of an embodiment of an inventive movable furniture part.

FIG. 6 shows a sectional view of an embodiment of an inventive item of furniture 9 with a movable furniture part 1 in the form of a drawer, whereby force sensors 4 are disposed between inner panel 3 and outer panel 2. The evaluation unit 7 is disposed so as to travel along on the movable furniture part 1. The electrical cables 8 leading from the force sensors 4 to the evaluation unit 7 are represented by a dotted line.

Figure 7:
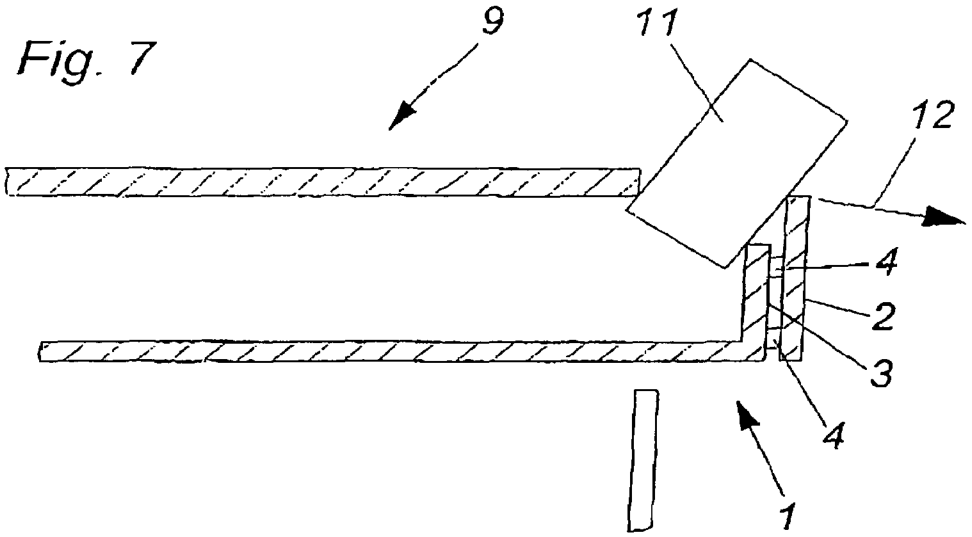
FIG. 7 is a sectional view of a further embodiment of an inventive item of furniture.

FIG. 7 shows a sectional view of a further embodiment of an inventive item of furniture 9 with a movable furniture part 1 in the form of a drawer, whereby the outer panel 2 projects beyond (extends above) the inner panel 3. The jamming of an object 11 between outer panel 2 and the item of furniture 9 is shown schematically. Due to the force exerted on the outer panel 2, the outer panel 2 is axially rotated in the direction shown by the arrow 12. This is registered by the force sensors 4 and reported via cables, not shown, to the control unit 6, which immediately stops the drive unit 5 and can, for example, also order a partial outward movement of the movable furniture part 1 to release the object 11. This provides protection against jamming.

Figure 8:
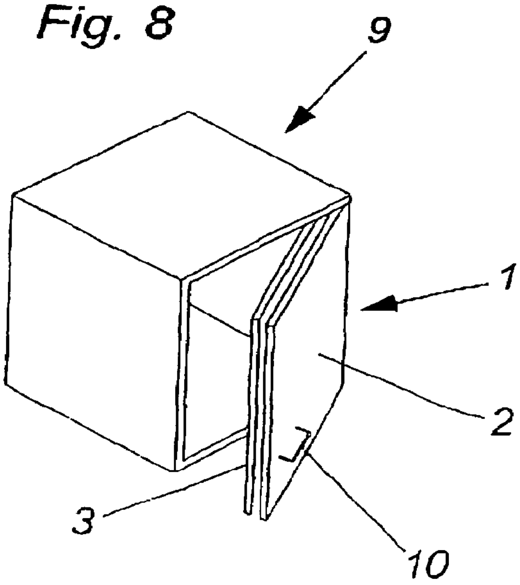
FIG. 8 is a schematic view of a further embodiment of an inventive item of furniture.

FIG. 8 shows a further embodiment of an inventive item of furniture 9, which is in the form of a cupboard. The movable furniture part 1 is a door which can be opened by means of a handle 10.

Figure 9:
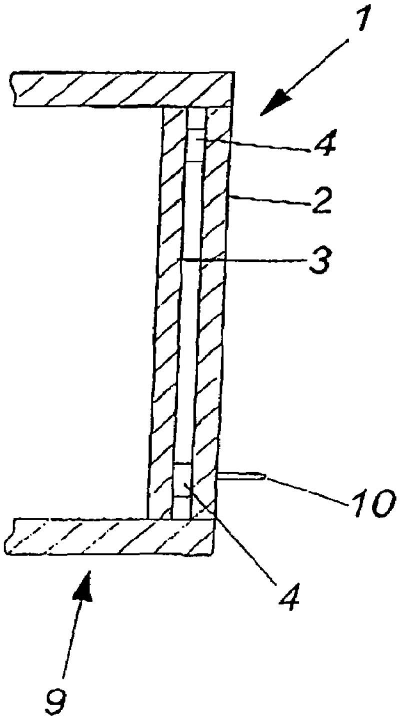
FIG. 9 is a sectional view of the item of furniture shown in FIG. 8.

FIG. 9 shows a sectional view through the item of furniture 9 shown in FIG. 8 where the door of the furniture is closed. It can be seen that the movable furniture part 1, i.e. the furniture door, has an inner panel 3 and an outer panel 2, between which force sensors 4 are disposed.

Figure 10B:
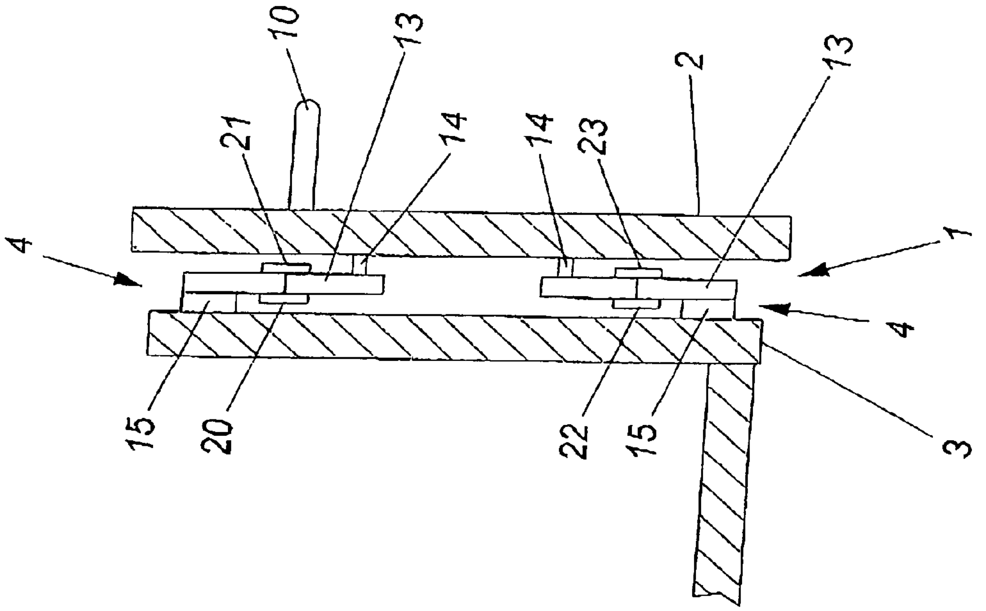
FIG. 10*a,b* are two sectional views of a further embodiment of an inventive movable furniture part.
Figure 10A:
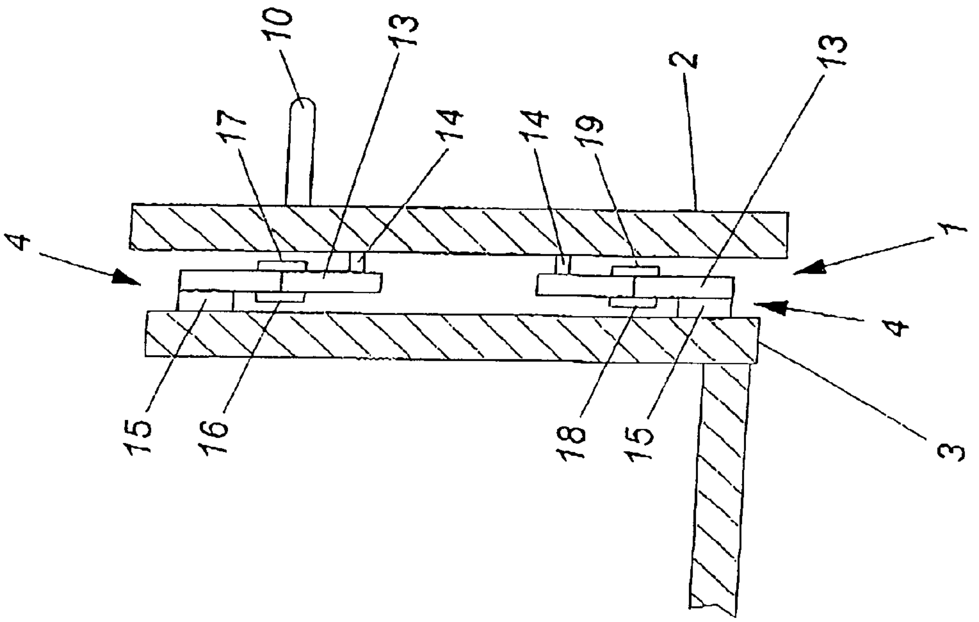

FIG. 10*a* shows a further embodiment of an inventive movable furniture part 1. Four force sensors 4 are disposed between inner panel 3 and outer panel 2 (only two of the force sensors 4 being visible in FIG. 10) and each force sensor 4 has two wire strain gauges 16-23 disposed on a flexible bar 13. Each flexible bar 13 is joined via a first intermediate piece 15 to the inner panel 3 and via a second intermediate piece 14 to the outer panel 2. FIG. 10*b* shows the force sensors 4, which cannot be seen in FIG. 10*a*.

Figure 11C:
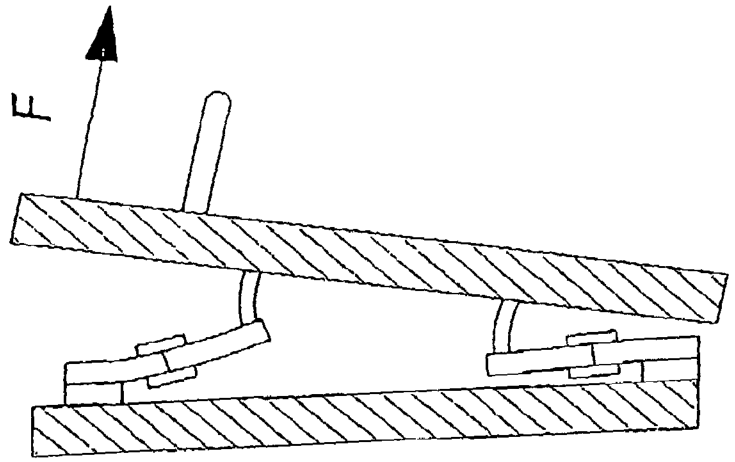
FIG. 11*a-c* are schematic sectional views through the movable furniture part shown in FIG. 10 for various types of use.
Figure 11B:
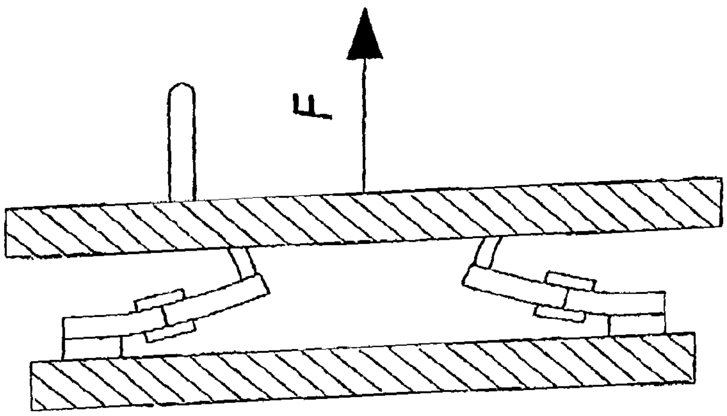
Figure 11A:
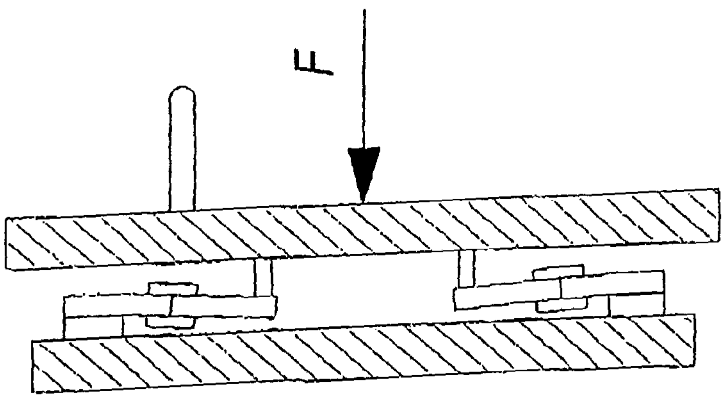

FIGS. 11*a-c* show the movable furniture part 1 represented in FIG. 10 for various situations of use. In FIG. 11*a*, the user exerts a pushing force F centrally on the outer panel 2, as a result of which the ends of the bars 13 linked by the intermediate pieces 15 flex in the direction of the inner panel 3. In FIG. 11*b*, the user exerts a pulling force F centrally on the outer panel 2, as a result of which the ends of the bars 13 linked by the intermediate pieces 15 flex in the direction of the outer panel 2. In FIG. 11*c*, the user exerts a pulling force F at the top of the outer panel 2, as a result of which the end of the upper bar 13 linked by the intermediate piece 15 flexes in the direction of the outer panel 2 and the end of the lower bar 13 linked by the intermediate piece 15 flexes in the direction of the inner panel 3.

Figure 12:
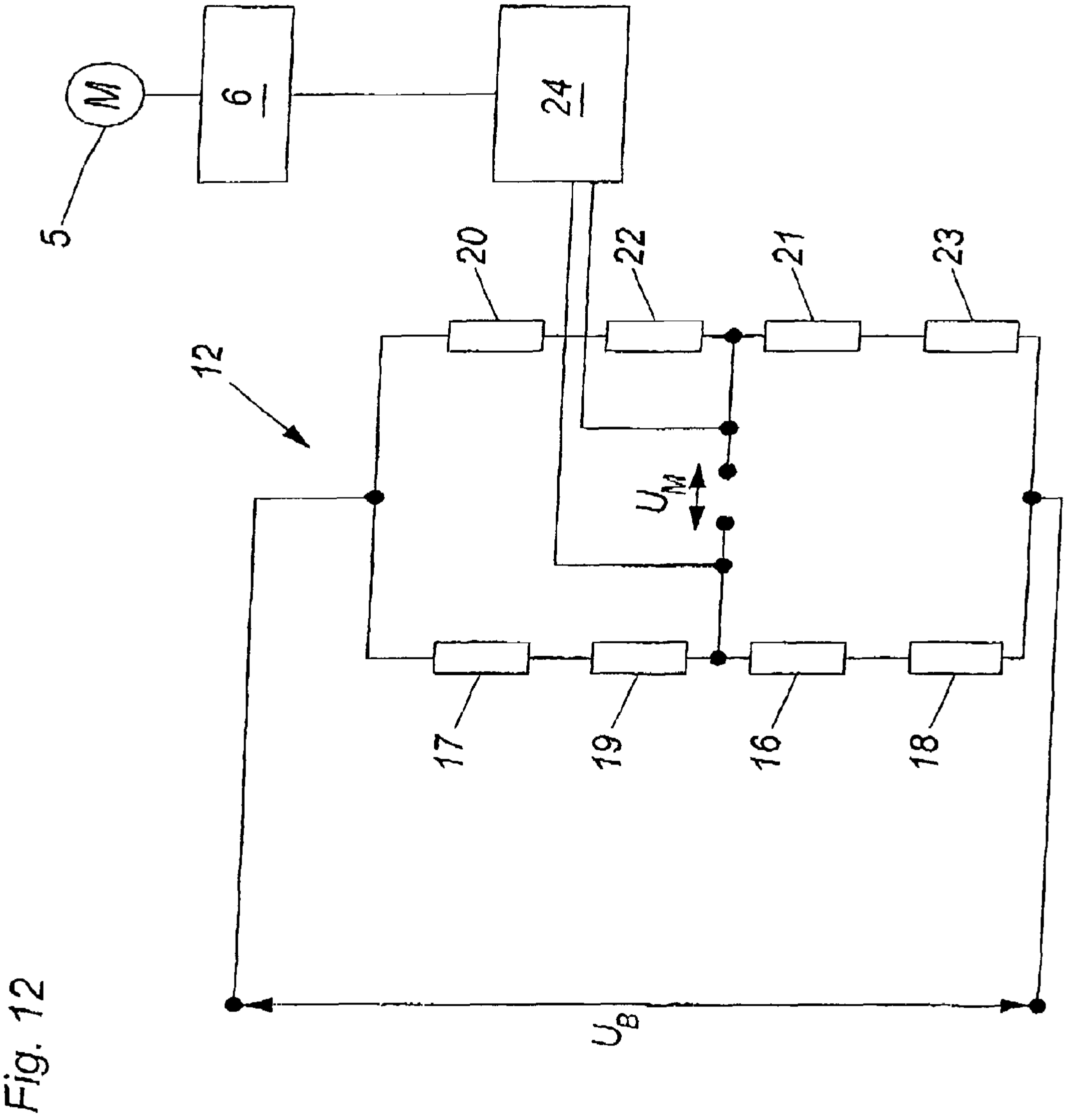
FIG. 12 is a diagram of the electrical circuit of the force sensors in the embodiment according to FIGS. 10 and 11*a-c*.

FIG. 12 shows the electrical circuit 12 of the wire strain gauges 17-23 of the embodiment shown in FIG. 10*a, b* and 11*a-c*. The wire strain gauges 17-23 are connected to form a full bridge (Wheatstone bridge), whereby the bridge imbalance $U_M$, as a proportion of the supply voltage $U_B$, is a measure of the total relative change in length of the wire strain gauges 17-23 and thus of the amount of force detected. The bridge imbalance $U_M$ is amplified in an amplifier 24 and fed to the control unit 6. The control unit 6 is connected to the drive unit 5, which takes the form of a motor.

The invention claimed is:

1. A furniture component comprising:

a storage compartment; and a movable furniture part including:

an outer panel having a front surface and a rear surface;

an inner panel having a front surface and a rear surface, said inner panel being arranged behind and spaced apart from said outer panel such that said front surface of said inner panel faces said rear surface of said outer panel, and such that said rear surface of said inner panel faces said storage compartment, said outer panel and said inner panel being arranged in a substantially vertical manner; and at least one force sensor operable to measure forces acting on said outer panel, said at least one force sensor being disposed between said outer panel and said inner panel.

2. The furniture component of claim 1, wherein said at least one force sensor comprises at least two force sensors disposed between said outer panel and said inner panel.

3. The furniture component of claim 1, wherein at least one of said at least one force sensor is disposed on said inner panel.

4. The furniture component of claim 1, wherein each of said at least one force sensor includes a wire strain gauge.

5. The furniture component of claim 4, wherein each wire strain gauge is electrically connected to a full bridge.

6. The furniture component of claim 1, wherein said movable furniture part is one of a drawer and a door.

7. The furniture component of claim 1, further comprising a drive unit operable to drive said movable furniture part.

8. The furniture component of claim 7, further comprising a control device to control said drive unit.

9. The furniture component of claim 1, further comprising an evaluation unit for receiving signals from said at least one force sensor of said movable furniture part.

10. The furniture component of claim 9, further comprising electrical cables for transmitting the signals from said at least one force sensor to said evaluation unit.

11. A piece of furniture comprising:

a furniture body;

a movable furniture part including an outer panel, said movable furniture part being mounted to said furniture body so as to be movable relative to said furniture body;

an evaluation unit;

at least two piezo-electric force sensors operable to measure forces acting on said outer panel of said movable furniture part;

electrical cables leading from said at least two force sensors to said evaluation unit for transmitting signals from said at least two force sensors to said evaluation unit, said electrical cables being connected in parallel with each other and being connected in series with said evaluation unit; and a storage compartment behind said outer panel of said movable furniture part.

12. The piece of furniture of claim 11, wherein said movable furniture part further includes an inner panel arranged behind and spaced apart from said outer panel, said at least two force sensors being disposed between said outer panel and said inner panel.

13. A piece of furniture comprising:

a furniture body;

a movable furniture part including an outer panel, said movable furniture part being mounted to said furniture body so as to be movable relative to said furniture body;

an evaluation unit located in or on said movable furniture part so as to travel with said movable furniture part;

at least one force sensor operable to measure forces acting on said outer panel of said movable furniture part, said evaluation unit being arranged to receive signals from said at least one force sensor; and a storage compartment behind said outer panel of said movable furniture part.

14. The piece of furniture of claim 13, wherein said movable furniture part further includes an inner panel arranged behind and spaced apart from said outer panel, said at least one force sensor being disposed between said outer panel and said inner panel.

15. The furniture component of claim 1, further comprising a furniture body including said storage compartment, said movable furniture part comprising a door hinged to said furniture body so as to open and close said storage compartment.

16. The furniture component of claim 1, further comprising a furniture body, said movable furniture part being mounted to said furniture body so as to be movable relative to said furniture body, said storage compartment being located in said movable furniture part.

17. The furniture component of claim 1, wherein said outer panel has a larger area than said inner panel and extends farther upward than said inner panel in a vertical direction.

* * * * *